(12) United States Patent
Kim et al.

(10) Patent No.: US 10,528,846 B2
(45) Date of Patent: Jan. 7, 2020

(54) METHOD AND APPARATUS FOR ANALYZING FACIAL IMAGE

(71) Applicant: Samsung Electronics Co., Ltd., Suwon-si (KR)

(72) Inventors: Youngsung Kim, Suwon-si (KR); Byungin Yoo, Seoul (KR); Deheng Qian, Beijing (CN); Hui Zhang, Beijing (CN); Chang Kyu Choi, Seongnam-si (KR); He Zheng, Beijing (CN); Jae-Joon Han, Seoul (KR); Jingtao Xu, Beijing (CN); Tianchu Guo, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 140 days.

(21) Appl. No.: 15/795,677

(22) Filed: Oct. 27, 2017

(65) Prior Publication Data

US 2018/0137388 A1  May 17, 2018

(30) Foreign Application Priority Data

Nov. 14, 2016 (CN) .......................... 2016 1 1025410
Aug. 2, 2017 (KR) ...................... 10-2017-0097998

(51) Int. Cl.
G06K 9/62 (2006.01)
G06K 9/00 (2006.01)
G06K 9/66 (2006.01)

(52) U.S. Cl.
CPC ......... G06K 9/623 (2013.01); G06K 9/00281 (2013.01); G06K 9/00288 (2013.01); G06K 9/6265 (2013.01); G06K 9/66 (2013.01)

(58) Field of Classification Search
CPC ...................................................... G06K 9/66
(Continued)

(56) References Cited

U.S. PATENT DOCUMENTS 8,184,926 B2   5/2012  Sun et al.
10,149,958 B1 * 12/2018 Tran ...................... A61M 21/00
(Continued)

FOREIGN PATENT DOCUMENTS

CN        107895150 A  *  4/2018

OTHER PUBLICATIONS

L. Yuan, et al., "Progressive Inter-scale and Intra-scale Non-blind Image Deconvolution," *Journal ACM Transactions on Graphics (TOG)—Proceedings of the ACM SIGGRAPH*, vol. 27, Issue 3, Aug. 2008 (9 pages, in English).
(Continued)

*Primary Examiner* — Dwayne D Bost
*Assistant Examiner* — Stephen M Brinich
(74) *Attorney, Agent, or Firm* — NSIP Law

(57) ABSTRACT

A method to analyze a facial image includes: inputting a facial image to a residual network including residual blocks that are sequentially combined and arranged in a direction from an input to an output; processing the facial image using the residual network; and acquiring an analysis map from an output of an N-th residual block among the residual blocks using a residual deconvolution network, wherein the residual network transfers the output of the N-th residual block to the residual deconvolution network, and N is a natural number that is less than a number of all of the residual blocks, and wherein the residual deconvolution network includes residual deconvolution blocks that are sequentially combined, and the residual deconvolution blocks correspond to respective residual blocks from a first residual block among the residual blocks to the N-th residual block.

20 Claims, 14 Drawing Sheets

(58) Field of Classification Search
USPC .......................................... 382/115–118, 165
See application file for complete search history.

(56) References Cited

U.S. PATENT DOCUMENTS

| | | | | |
|---|---|---|---|---|
| 2016/0140146 A1* | 5/2016 | Wexler | ..................... | G06K 9/18 |
| | | | | 707/741 |
| 2017/0312614 A1* | 11/2017 | Tran | ..................... | H04W 4/027 |
| 2018/0060649 A1* | 3/2018 | Kastaniotis | ......... | G06K 9/00288 |

OTHER PUBLICATIONS

P. Svoboda, et al., "Compression Artifacts Removal Using Convolutional Neural Networks," *Journal of WSCG, Proceedings of ArXiv*, vol. arXiv:1605.00366v1 [cs.CV], May 2016 (10 pages, in English).

X-J Mao, et al., "Image Restoration Using Convolutional Auto-encoders with Symmetric Skip Connections," *Proceedings of ArXiv, Subject: Computer Vision and Pattern Recognition*, vol. arXiv:1606.08921v3 [cs.CV], Aug. 2016, pp. 1-17.

S. Liu, et al., "Label distribution based facial attractiveness computation by deep residual learning," *Journal of Electronic Imaging, Proceedings of ArXiv*, vol. arXiv:1609.00496v2 [cs.CV], Sep. 2016 (3 pages, in English).

Y. Cao, et al., "Estimating Depth from Monocular Images as Classification Using Deep Fully Convolutional Residual Networks," *IEEE Transactions Circuits and Systems for Video Technology*, vol. PP, Issue 99, Aug. 2017, pp. 1-11.

* cited by examiner

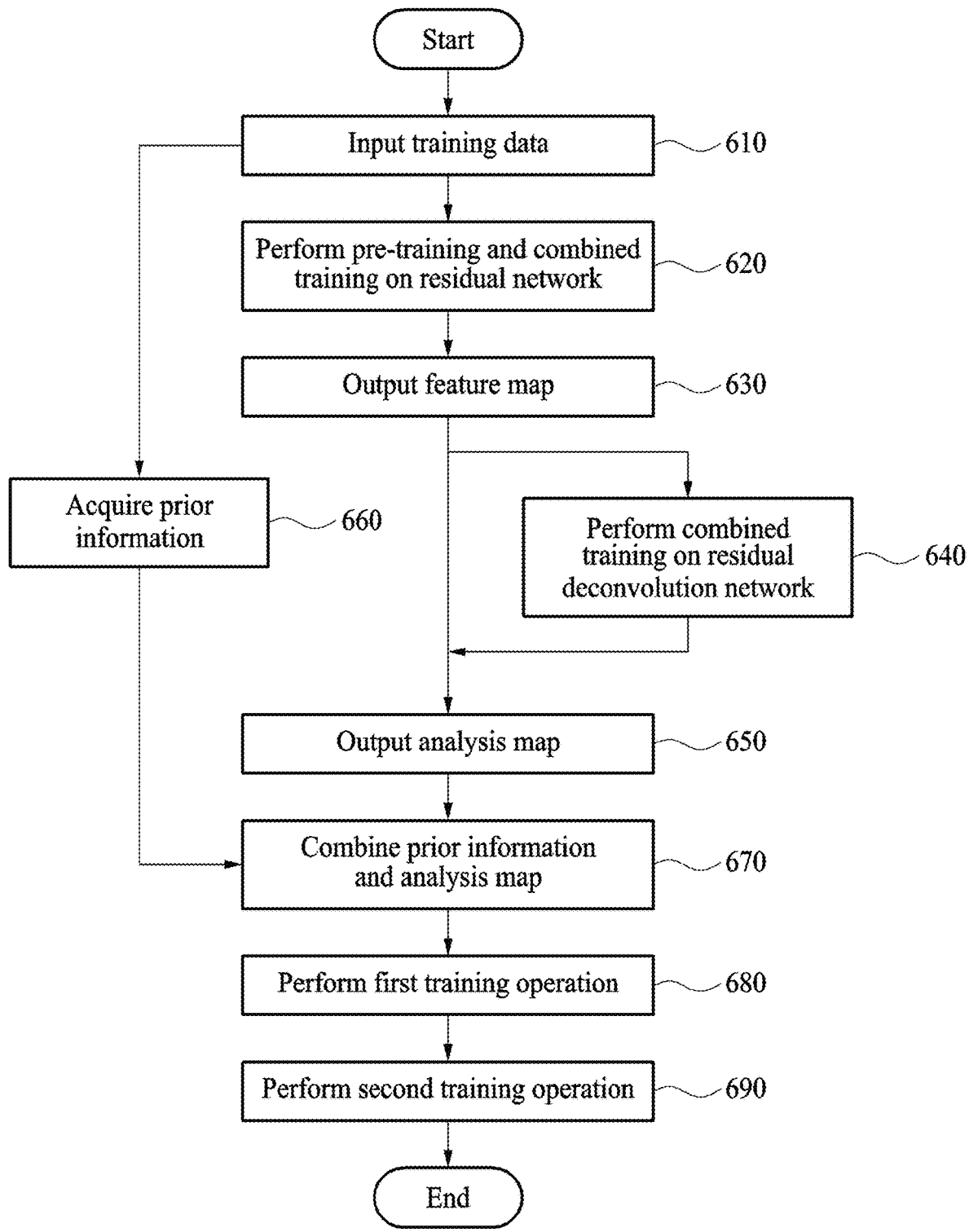

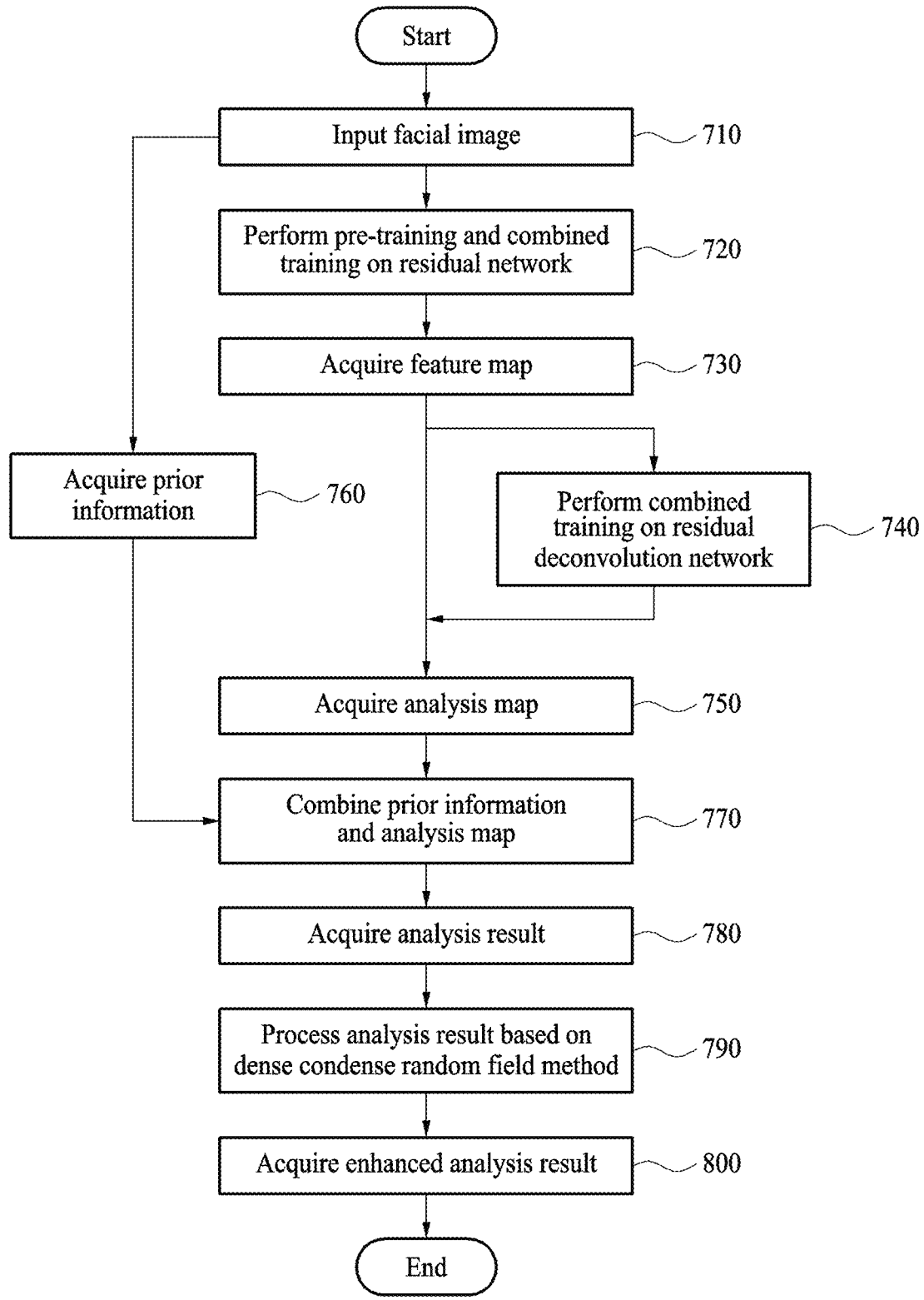

METHOD AND APPARATUS FOR ANALYZING FACIAL IMAGE

CROSS-REFERENCE TO RELATED APPLICATIONS

This application claims the benefit under 35 U.S.C § 119(a) of Chinese Patent Application No. 201611025410.7 filed on Nov. 14, 2016 in the State Intellectual Property Office of the People's Republic of China, and Korean Patent Application No. 10-2017-0097998 filed on Aug. 2, 2017 in the Korean Intellectual Property Office, the entire disclosures of which are incorporated herein by reference for all purposes.

BACKGROUND

1. Field

The following description relates to a method and apparatus for analyzing a facial image, and more particularly, to a technology for analyzing a facial image by performing a convolution operation or a deconvolution operation of a neural network.

2. Description of Related Art

A computer-based visual technology may automatically identify, track, and measure a target using cameras and computers as replacements for human eyes. A signal processed by processing an image may be appropriate for a human eye or a computer input. A semantic analysis through deep learning refers to an analysis of each pixel point in an image when one image is provided. A deep neural network may abstract a low-dimensional feature of an input image. However, in an operation of analyzing a meaning, it may be difficult to extract a feature through a neural network, reduce a resolution of the feature using a pooling layer, and change a low-dimensional feature map with high efficiency to an analysis result of a high-dimensional pixel level.

The above description of related art is knowledge possessed or acquired by the inventor(s) as a result of a derivation process related to the present disclosure, and is not necessarily prior known technology, that is, technology publicly disclosed prior to the filing of this disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method to analyze a facial image includes: inputting a facial image to a residual network including residual blocks that are sequentially combined and arranged in a direction from an input to an output; processing the facial image using the residual network; and acquiring an analysis map from an output of an N-th residual block among the residual blocks using a residual deconvolution network, wherein the residual network transfers the output of the N-th residual block to the residual deconvolution network, and N is a natural number that is less than a number of all of the residual blocks, and wherein the residual deconvolution network includes residual deconvolution blocks that are sequentially combined, and the residual deconvolution blocks correspond to respective residual blocks from a first residual block among the residual blocks to the N-th residual block.

The method may further include: acquiring prior information of the facial image using a prior information acquiring network; and acquiring an analysis result by combining the prior information and an output of the residual deconvolution network.

The acquiring of the prior information of the facial image may include selecting facial image analysis training data including a face most similar to a face included in the facial image by comparing the face included in the facial image to each of faces included in the facial image analysis training data, and acquiring an average value of calibration information acquired from the face most similar the face included in the facial image as the prior information of the facial image.

The acquiring of the analysis result may include acquiring a combination map by combining the prior information and the analysis map output from the residual deconvolution network, acquiring a contribution plot of the prior information by performing a convolution process on the combination map using a convolution kernel, and acquiring the analysis result by adding the contribution plot and the analysis map at an element level.

The method may further include: enhancing the analysis result using a dense condition random field method.

The enhancing of the analysis result may include enhancing the analysis result by setting the analysis result as a unary term of a dense condition random field.

The residual network may further include a convolution block positioned before the first residual block, and the residual deconvolution network may further include a deconvolution block positioned after a last residual deconvolution block among the residual deconvolution blocks.

A max pooling operation may be performed on an output of the first residual block. A result of the performing of the max pooling operation may be input to a next level of a residual block of the first residual block. A max anti-pooling operation may be performed on an output of a first residual deconvolution block among the residual deconvolution blocks. A result of the performing of the max anti-pooling operation may be input to a next level of a residual deconvolution block of the first residual deconvolution block.

Each of the residual deconvolution blocks may include a denser, a detail trainer, and a dimension reducer.

The detail trainer may include a residual branch and a deconvolution branch.

The residual network may include four or five residual blocks, and a number of the residual deconvolution blocks may be one less than a number of the residual blocks.

Each convolution layer among convolution layers of a convolution block included in the residual network may include 64 convolution kernels, and each deconvolution layer among deconvolution layers of a deconvolution block included in the residual deconvolution network may include 64 deconvolution kernels.

The residual blocks may increase a number of input data channels by two times, and the residual deconvolution blocks may decrease the number of the input data channels by half.

The N-th residual block may be a next-to-last residual block or a second-from-last residual block among the residual blocks.

In another general aspect, a facial image analyzing apparatus includes: a processor configured to input a facial image to a residual network configured to process the facial image and including residual blocks that are sequentially combined and arranged in a direction from an input to an output; and a residual deconvolution network configured to acquire an analysis map from an output of an N-th residual block among the residual blocks, wherein the residual network is configured to transfer the output of the N-th residual block to the residual deconvolution network, and N is a natural number that is less than a number of all residual blocks of the residual network, and wherein the residual deconvolution network includes residual deconvolution blocks that are sequentially combined, and the residual deconvolution blocks correspond to respective residual blocks from a first residual block among the residual blocks to the N-th residual block.

The facial image analyzing apparatus may further include: a prior information acquiring network configured to acquire prior information of the facial image, and to acquire an analysis result by combining the prior information and an output of the residual deconvolution network.

The processor may be further configured to enhance the analysis result based on a dense condition random field method.

In another general aspect, a training method of a facial image analyzing apparatus that includes a residual network and a residual deconvolution network includes: training, in a pre-training operation, the residual network by adjusting a weight parameter of the residual network using face identification training data; and training, in a combined training operation, the residual network and the residual deconvolution network by adjusting a weight parameter of the residual deconvolution network and additionally adjusting the weight parameter of the residual network using facial image analysis training data. The residual network includes residual blocks that are sequentially combined and arranged in a direction from an input to an output, processes a facial image, and transfers an output of an N-th residual block among the residual blocks to the residual deconvolution network, wherein N is a natural number that is less than a number of all residual blocks of the residual network. The residual deconvolution network acquires an analysis map from the output of the N-th residual block and includes residual deconvolution blocks that are sequentially combined, and the residual deconvolution blocks correspond to respective residual blocks from a first residual block among the residual blocks to the N-th residual block.

The training in the pre-training operation may include pre-training the residual network by inputting the face identification training data to the residual network, performing a face identifying operation, performing an average pooling operation on an output of a last residual block among the residual blocks, performing a full join operation on the residual network, and adjusting a weight parameter of the residual network.

The training in the combined training operation may include adjusting the weight parameter of the residual network and the weight parameter of the residual deconvolution network by initializing the weight parameter of the residual network to be a weight parameter acquired from the pre-training operation, randomly initializing the weight parameter of the residual deconvolution network, inputting the output of the N-th residual block to the residual deconvolution network, inputting the facial image analysis training data to the residual network, and performing a facial image analyzing operation using the residual network and the residual deconvolution network.

Other features and aspects will be apparent from the following detailed description, the drawings, and the claims.

BRIEF DESCRIPTION OF THE DRAWINGS

FIG. 6 is a flowchart illustrating an example of an operation of training a facial image analyzing apparatus.

FIG. 7 is a flowchart illustrating another example of a method of analyzing a facial image.

Figure 1:
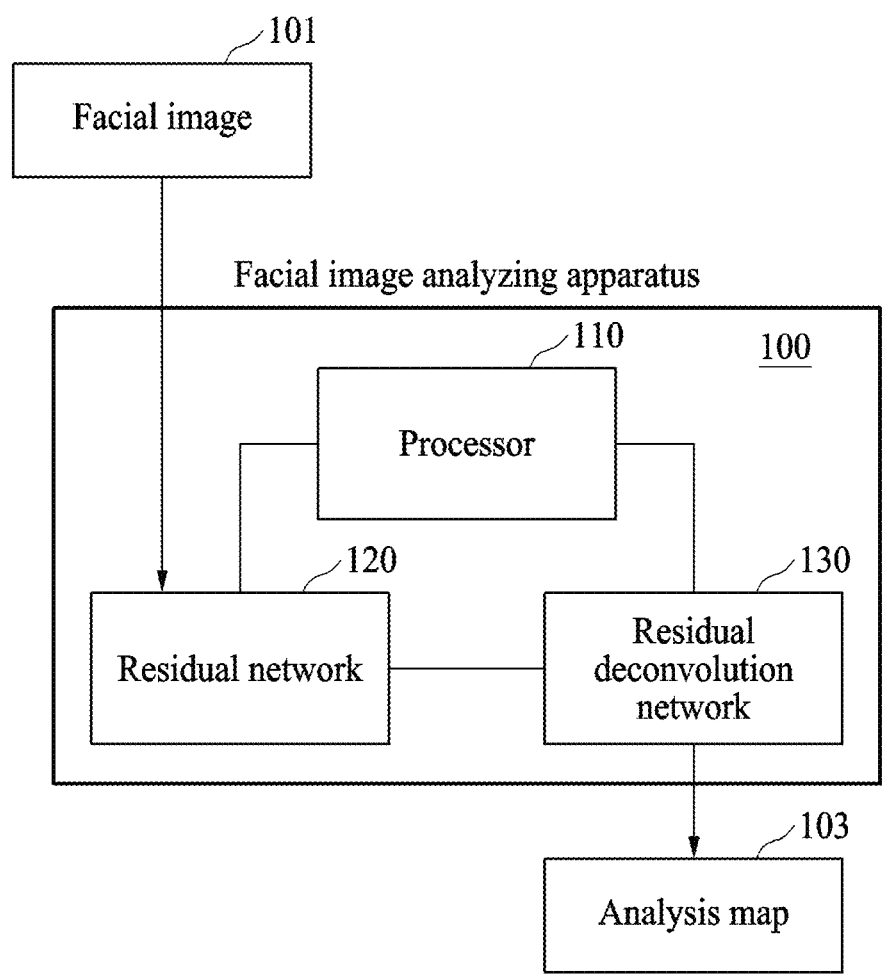
FIG. 1 is a block diagram illustrating an example of a facial image analyzing apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Also, in the description of embodiments, detailed description of well-known related structures or functions will be omitted when it is deemed that such description will cause ambiguous interpretation of the present disclosure.

FIG. 1 is a block diagram illustrating an example of a facial image analyzing apparatus 100. Referring to FIG. 1, in an example, the facial image analyzing apparatus 100 includes a processor 110, a residual network 120, and a residual deconvolution network 130.

The processor 110 inputs an input image to be analyzed to the residual network 120. An input includes a facial image 101 and various types of images. For example, an input includes a facial image, a virtual human face, or an animal face generated by computer graphics.

A "residual" is a difference between an input and an estimation value or a fitting value. An output of a residual network may be acquired by adding an output and an input of convolution cascades and activating a rectified linear unit (ReLU). In this example, a phase of an output of a convolution layer is identical to a phase of an input of the convolution layer.

The residual network 120 processes the facial image 101. The residual network 120 includes residual blocks that are sequentially combined and arranged in a direction from an input to an output. The residual network 120 transfers an output of an N-th residual block to the residual deconvolution network 130, and N is a natural number that is less than a number of all residual blocks of the residual network 120.

The residual deconvolution network 130 acquires an analysis map 103 from the output of the N-th residual block among the residual blocks. The residual deconvolution network 130 includes residual deconvolution blocks that are sequentially combined, and the residual deconvolution blocks correspond to the respective residual blocks from a first residual block to the N-th residual block.

In response to a predetermined N-th residual block corresponding to a next-to-last residual block among the residual blocks, a better analysis result may be acquired. Also, the predetermined N-th residual block may correspond to a second-from-last residual block among the residual blocks.

The residual network 120 effectively extracts a facial feature in response to a pre-training operation being performed by a face identifying operation. A feature map of a high resolution is generated and an accurate analysis result is acquired by performing a combined training operation by a facial image analyzing operation. The facial image analyzing apparatus 100 adjusts an entire network well, using prior information. The facial image analyzing apparatus 100 enhances the analysis result based on a dense condition random field method.

Figure 2:
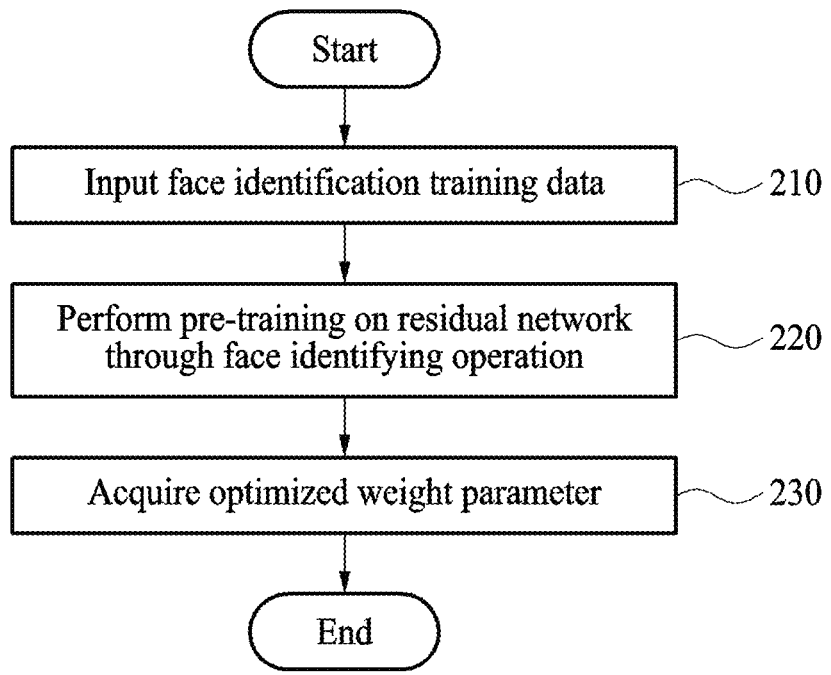
FIG. 2 is a flowchart illustrating an example of an operation of performing a pre-training operation on a residual network.

FIG. 2 is a flowchart illustrating an example of an operation of performing a pre-training operation on the residual network 120. Referring to FIG. 2, the residual network 120 is pre-trained by a face identifying operation during a pre-training operation. The residual network 120 is trained by adjusting a weight parameter of the residual network 120 using face identification training data in the pre-training operation.

In operation 210, a weight parameter of a convolution kernel in the residual network 120 is randomly initialized, and the face identification training data stored in a training database is input to the residual network 120. The face identification training data includes facial images.

Then, in operation 220, the face identifying operation is performed using the face identification training data. The pre-training operation is performed on the residual network 120 by performing the face identifying operation. A convolution block and a residual block perform the face identifying operation with respect to the input face identification training data. An average pooling operation is performed on an output of a last residual block of the residual network 120, and a full join operation is performed on the residual network 120. A weight of the convolution kernel of the residual network 120 is adjusted and a value of a softmax function is minimized by performing the full join operation on the residual network 120. The softmax function is a type of loss function.

The weight of the convolution kernel is adjusted by performing the full join operation on a number of persons having same identification in the training database. The value of the softmax function is minimized in response to each piece of face identification training data being input and thus, the residual network 120 is trained to accurately recognize an identification from each face in the training data. For example, in response to data being trained by the face identifying operation, a number corresponding to a number of persons is output by the full join operation when persons having different identifications are included in the training database.

Next, in operation 230, the optimized weight parameter is acquired. Thus, the residual network 120 is pre-trained by adjusting the weight parameter of the residual network 120.

Figure 3:
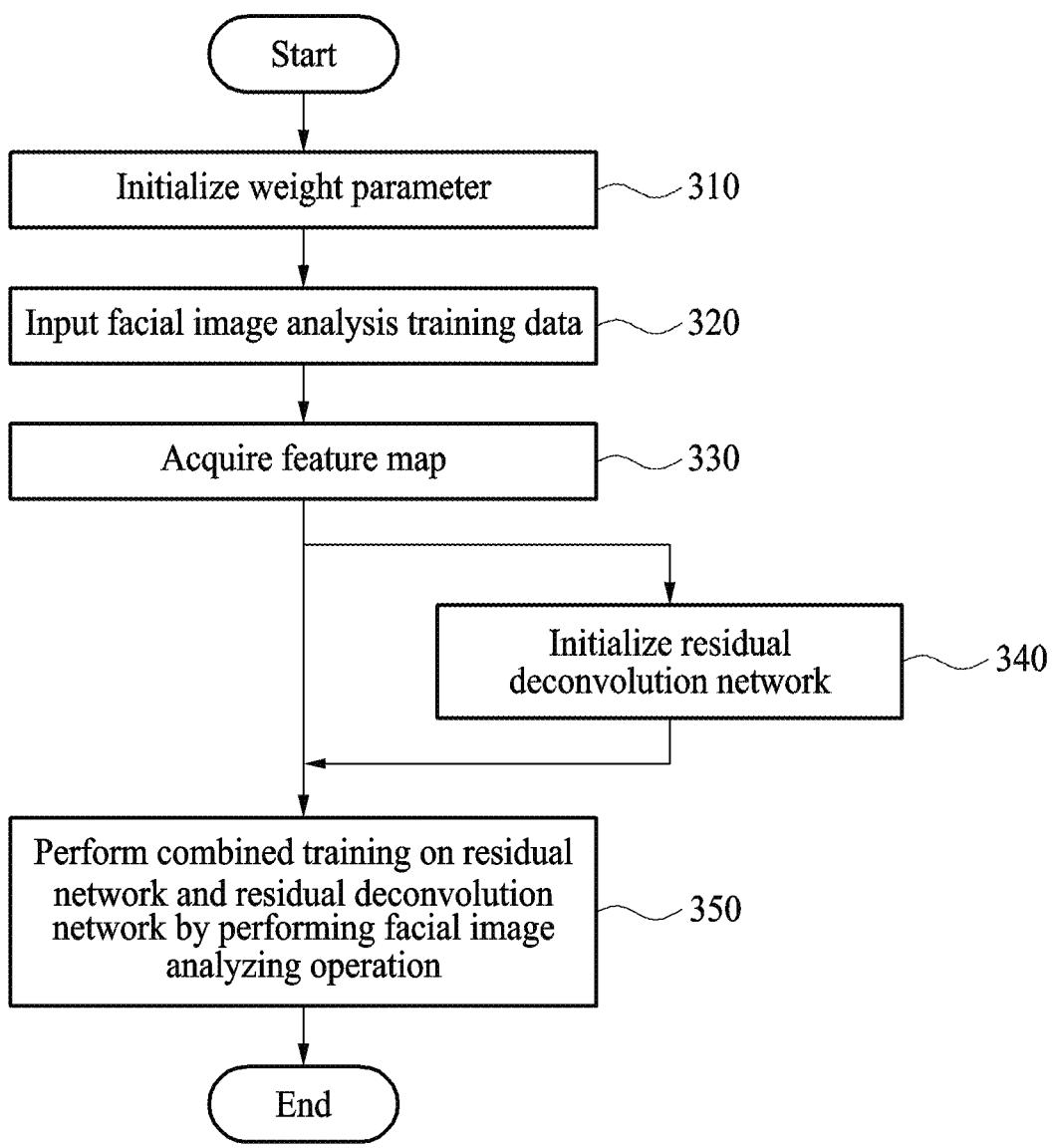
FIG. 3 is a flowchart illustrating an example of performing a combined training operation on a residual network and a residual deconvolution network.

FIG. 3 is a flowchart illustrating an example of performing a combined training operation on the residual network 120 and the residual deconvolution network 130. Referring to FIG. 3, in the combined training operation, a last block of the residual network 120 is removed, the residual deconvolution network 130 is accumulatively combined with the residual network 120, and the entire network is adjusted by a facial image analyzing operation.

In operation 310, a weight parameter of the residual network 120 is initialized to be a weight parameter acquired in a pre-training operation.

Next, in operation 320, facial image analysis training data is input to the residual network 120.

Then, in operation 330, a feature map is acquired. The feature map is associated with an output of an N-th residual block of the residual network 120. For example, a feature map is associated with an output of a next-to-last residual block. The feature map may have a low resolution.

Subsequently, in operation 340, the residual deconvolution network 130 is initialized. A weight parameter of the residual deconvolution network 130 is randomly initialized, and the output of the N-th residual block is input to the residual deconvolution network 130. The residual deconvolution network 130 may be additionally processed by the feature map.

Thereafter, in operation 350, the combined training operation is performed on the residual network 120 and the residual deconvolution network 130 by performing a facial image analyzing operation using the facial image analysis training data. The combined training operation is performed on the residual network 120 and the residual deconvolution network 130 by adjusting the weight parameter of the residual deconvolution network 130 and additionally adjusting the weight parameter of the residual network 120 using the facial image analysis training data.

A weight parameter of a convolution kernel in the residual deconvolution network 130 is optimized, and a weight parameter of a convolution kernel in the residual network 120 is also optimized. A value of a softmax function is minimized in response to the weight parameter of the residual deconvolution network 130 and the weight parameter of the residual network 120 being adjusted.

The training data used in the pre-training operation and the combined training operation may be associated with a facial image which is not preprocessed. However, training data on which a random mirroring or a random cut-out is performed may be used. The random mirroring is a horizontal reverse or a vertical reverse, and the random cut-out is a preprocessing operation for editing a facial image in a predetermined size. A volume of the training data may increase in response to the preprocessing operation being performed on the training data.

For example, a facial image is edited to be an image in a predetermined size, for example, 224*224, in response to the random cut-out being performed, or the random mirroring is performed on the facial image. An input of a convolution block is associated with a source image of the training data, a result of the random mirroring, a result of the random cut-out, or a result of applying both the random mirroring and the random cut-out. The preprocessing operation reduces an overfitting phenomenon occurring when an identical image is trained multiple times.

Figure 4:
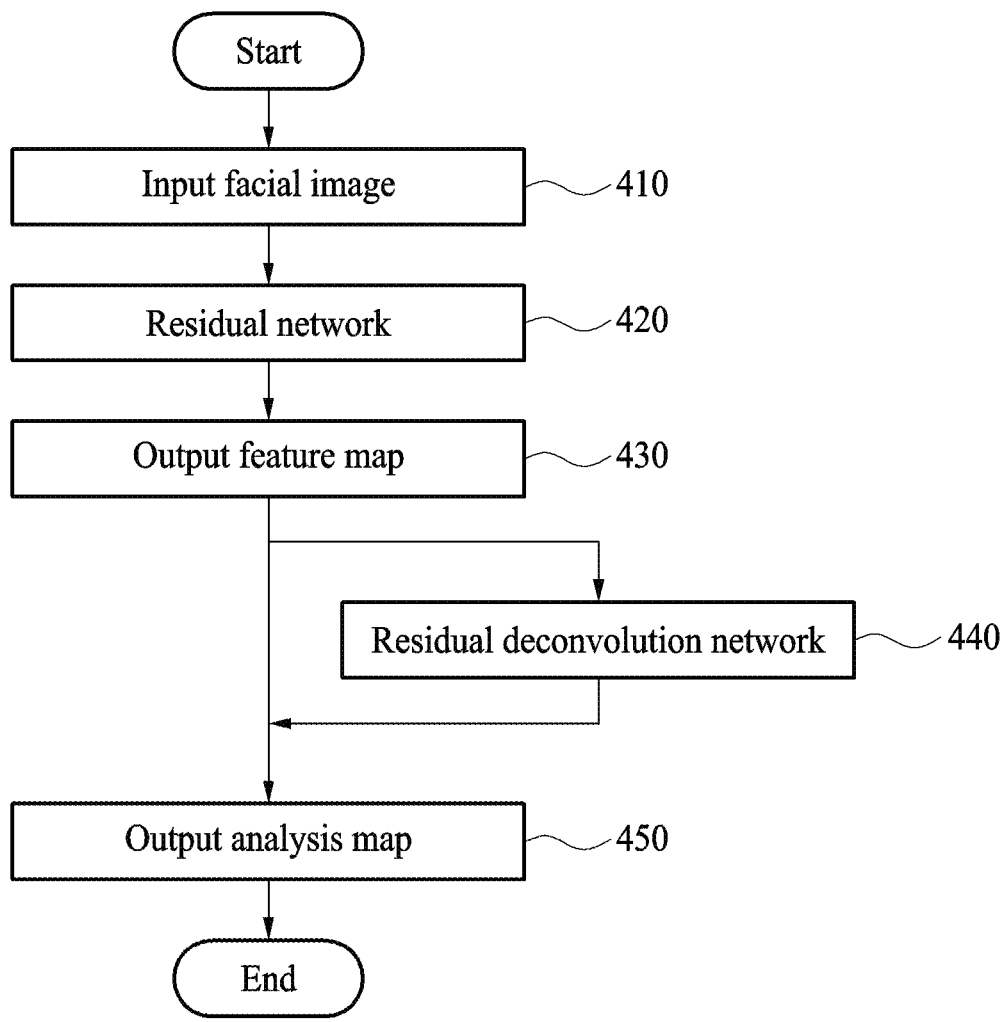
FIG. 4 is a flowchart illustrating an example of a method of analyzing a facial image.

FIG. 4 is a flowchart illustrating an example of a method of analyzing a facial image.

Referring to FIG. 4, in operation 410, a facial image is input to a residual network on which a pre-training operation is performed. Then, in operation 420, the residual network processes the facial image. In operation 430, the residual network outputs a feature map as a result of processing the facial image. The feature map may be associated with an output of a next-to-last residual block of the residual network. Next, in operation 440, the feature map is input to a residual deconvolution network. Subsequently, in operation 450, the residual deconvolution network outputs an analysis map. The analysis map is referred to as an analysis result.

Figure 5:
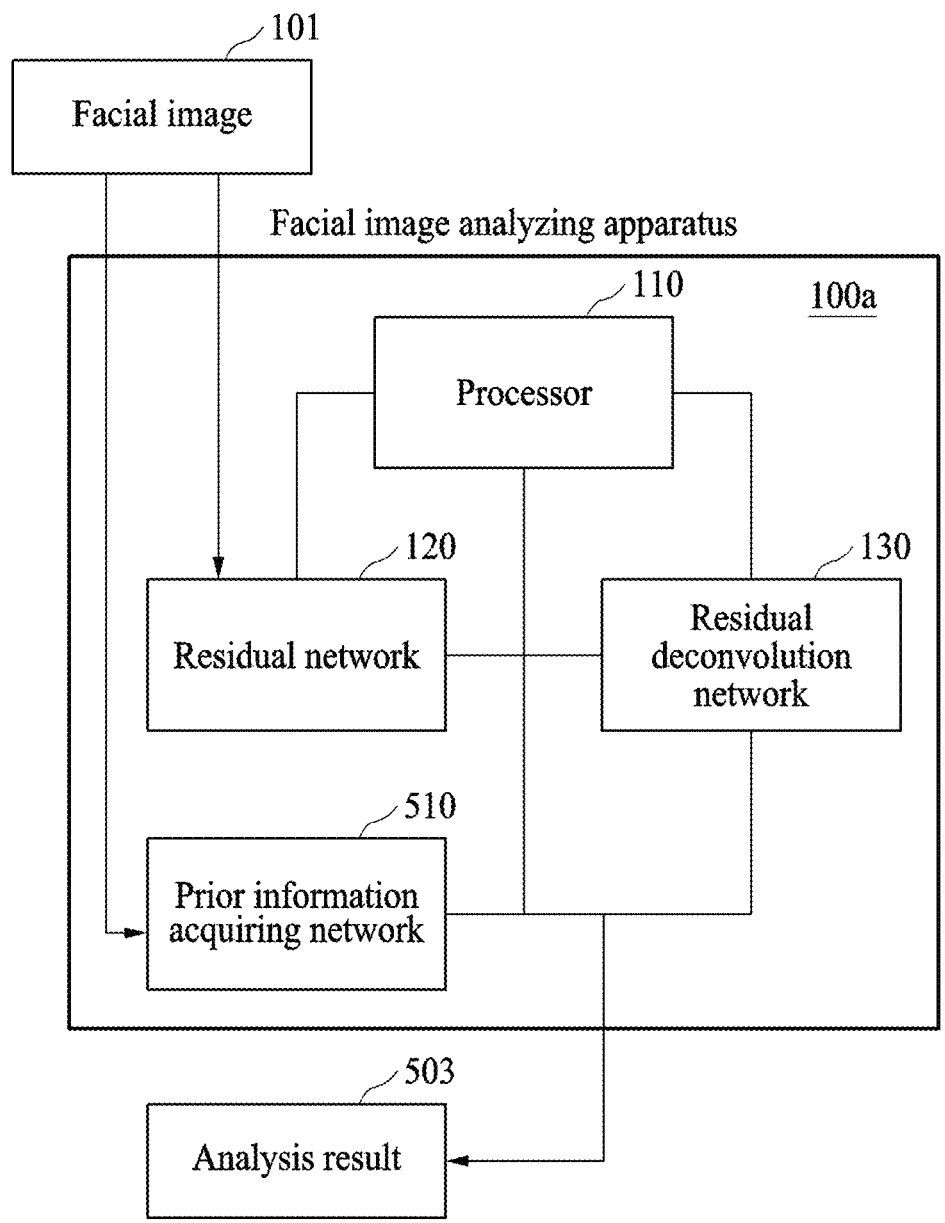
FIG. 5 is a block diagram illustrating another example of a facial image analyzing apparatus.

FIG. 5 is a block diagram illustrating another example of a facial image analyzing apparatus 100a.

Referring to FIG. 5, the facial image analyzing apparatus 100a includes the processor 110, the residual network 120, the residual deconvolution network 130, and a prior information acquiring network 510.

The facial image 101 is input to the residual network 120. The processor 110 acquires an analysis result 503 by combining an output of the prior information acquiring network 510 and an output of the residual deconvolution network 130. The processor 110 enhances the analysis result 503 based on a dense condition random field method. The processor 110 acquires a more accurate analysis result by setting the analysis result 503 as a unary term of a dense condition random field.

FIG. 6 is a flowchart illustrating an example of an operation of training the facial image analyzing apparatus 100a. The residual network 120 of the facial image analyzing apparatus 100a is trained in a pre-training operation, and the residual network 120 and the residual deconvolution network 130 are trained in a combined training operation. The facial image analyzing apparatus 100a trains the prior information acquiring information 510 using the residual network 120 and the residual deconvolution network 130 trained in the pre-training operation and the combined training operation, and may additionally train the residual network 120 and the residual deconvolution network 130.

In operation 610, training data is input to the residual network 120. Here, the training data includes facial image analysis training data. In operation 620, the residual network 120 processes the training data. In operation 630, the residual network 120 outputs a feature map as a result of processing the training data. The feature map may be associated with a next-to-last residual block of the residual network 120. In operation 640, the feature map is input to the residual deconvolution network 130. Then, in operation 650, the residual deconvolution network 130 outputs an analysis map.

In operation 660, the prior information acquiring network 510 acquires prior information from the training data. In operation 670, the prior information is combined with the analysis map. In operation 680, a first training operation is performed on the prior information acquiring network 510. In operation 690, a second training operation is performed on the residual network 120, the residual deconvolution network 130, and the prior information acquiring network 510.

In the first training operation, all parameters excluding a weight parameter of the prior information acquiring network 510 are fixed, and the weight parameter of the prior information acquiring network 510 is adjusted. The weight parameter optimized in the first training operation is acquired and a value of a softmax function is minimized.

In the second training operation, the prior information acquiring network 510 is initialized using the adjusted weight parameter, and all parameters excluding the weight parameter of the prior information acquiring network 510 are unfixed. All parameters excluding the weight parameter of the prior information acquiring network 510 are adjusted.

In the second training operation, the residual network 120 and the residual deconvolution network 130 are adjusted and each weight parameter of the prior information acquiring network 510 is additionally adjusted in response to a facial image analyzing operation being performed on the residual network 120, the residual deconvolution network 130, and the prior information acquiring network 510 using the facial image analysis training data.

A facial image which is not preprocessed may be used as the training data for training the entire network including the prior information acquiring network 510. However, training data on which a random mirroring or a random cut-out is performed may be used. A volume of the training data increases in response to the preprocessing operation being performed on the training data. The training data includes face identification training data and the facial image analysis training data.

For example, a facial image is edited to be an image in a predetermined size, for example, 224*224, in response to the random cut-out being performed, or the random mirroring is performed on the facial image. An input of a convolution block is associated with a source image of the training data, a result of the random mirroring, a result of the random cut-out, or a result of applying both the random mirroring and the random cut-out. The preprocessing operation reduces an overfitting phenomenon occurring when an identical image is trained a plurality of number of times.

FIG. 7 is a flowchart illustrating another example of a method of analyzing a facial image.

Referring to FIG. 7, in operation 710, a facial image to be analyzed is input to an entire network. Then, in operation 720, a pre-training operation and a combined training operation are performed on the input facial image by the residual network 120. In operation 730, a feature map is acquired from the residual network 120 as a result of processing the facial image in operation 720. In operation 740, the feature map is input to the residual deconvolution network 130. In this operation, the combined training operation is performed on the residual deconvolution network 130 in advance. Subsequently, in operation 750, an analysis map is acquired from the residual deconvolution network 130.

In operation 760, prior information is acquired from the input facial image by the prior information acquiring network 510. The prior information is associated with the input facial image. The facial image analyzing apparatus 100 uses different facial images stored in a training database. For example, information on a type of each facial image is represented through calibration. For example, each portion in a facial image represents a background, skin, hair, or five sensory organs.

The facial image analyzing apparatus 100 selects the facial image analysis training data including a face most similar to a face included in the facial image. The facial image analyzing apparatus 100 selects the most similar face or a group of face by comparing the face in the facial image to be analyzed to a face in a facial image stored in the training database. The facial image analyzing apparatus 100 acquires an average value of calibration information acquired from the most similar face or acquires prior information by calculating an average value of the selected group.

In operation 770, the facial image analyzing apparatus 100 combines the prior information and the analysis map. In operation 780, the facial image analyzing apparatus 100 acquires an analysis result as a result of the combining. In operation 790, the analysis result is processed based on a dense condense random field method. Subsequently, in operation 800, the facial image analyzing apparatus 100 acquires an enhanced analysis result as a result of the processing.

Figure 8A:
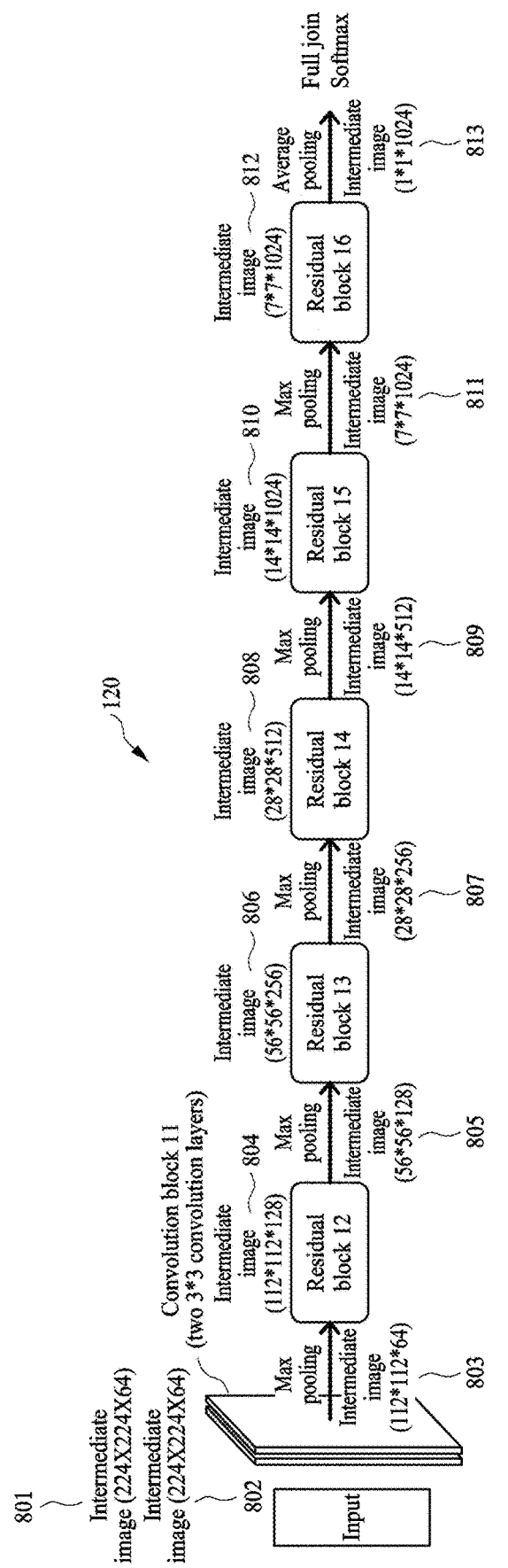
FIG. 8A illustrates an example of a residual network.

FIG. 8A illustrates an example of the residual network 120.

Referring to FIG. 8A, the residual network 120 includes residual blocks 12 through 16 that are sequentially combined and arranged in a direction from an input to an output. For example, the residual network 120 includes a convolution block 11 and residual blocks 12 through 16 in the direction from the input to the output. The convolution block 11 is positioned before the first residual block 12. The residual network 120 transfers, to the residual convolution network 130, a predetermined N-th residual block among the residual blocks 12 through 16 that are sequentially combined. Here, N is a natural number and is less than a number of all residual blocks included in the residual network 120. For example, an output of the residual block 15 is transferred to the residual convolution network 130.

For example, the convolution block 11 includes two accumulated convolution layers. A size of a convolution kernel in a convolution layer is 3*3, and a number of convolution kernels of each of the convolution layers is 64. The convolution block 11 changes the input data to be in an appropriate form to receive the residual blocks. The above-described number of the convolution kernels and the above-described size of the convolution kernel are only examples, and the number and the size are not limited to these examples.

For example, in response to three red-green-blue (RGB) channels and a 224*224 facial image being input, the facial image is represented as 224*224*3. A convolution operation is performed on the 224*224*3 facial image input to a first convolution layer by 64 3*3 convolution kernels such that an intermediate image 801 is generated. The convolution operation is re-performed on the intermediate image 801 by the 64 3*3 convolution kernels such that a 224*224*64 intermediate image 802 is generated.

The residual blocks are connected in response to performing a max pooling operation. The max pooling operation indicates an operation of setting a maximum value within a range in a predetermined size as a representative value of the range. For example, in response to a 2*2 max pooling operation being performed on an input image, a maximum value of 2*2 range of the input image is set to be a representative value of the 2*2 range and other values are omitted. An average pooling operation indicates an operation of setting an average value within a range in a predetermined size to be a representative value of the range. For example, in response to a 7*7 average pooling process being performed on an input image, an average value of the 7*7 range of the input image is set to be a representative value of the 7*7 range and other values are omitted.

A max pooling operation is performed on an output of the first residual block 12 among the residual blocks 12 through 16, and a result of performing the max pooling operation is input to a next level of a residual block 13 of the first residual block 12.

In response to the max pooling operation being performed on the intermediate image 802, a 112*112*64 intermediate image 803 is generated. The max pooling decreases a size of an image by half. The intermediate image 803 is input to the residual block 12, and the residual block 12 outputs a 112*112*128 intermediate image 804 by increasing a dimension of the intermediate image 803. Thus, a number of channels of the intermediate image 803 increases from 64 to 128.

The max pooling operation is performed on the intermediate image 804 and a 56*56*128 intermediate image 805 is output. The intermediate image 805 is converted into an intermediate image 806 of which a dimension increases by 56*56*256 by the residual block 13. The max pooling operation is performed on the intermediate image 806 and a 28*28*256 intermediate image 807 is output. The intermediate image 807 is converted into an intermediate image 808 of which a dimension increases by 28*28*512 by the residual block 14. The max pooling operation is performed on the intermediate image 808 and a 14*14*512 intermediate image 809 is output. The intermediate image 809 is converted into an intermediate image 810 of which a dimension increases by 14*14*1024 by the residual block 15. The max pooling operation is performed on the intermediate image 810 and a 7*7*1024 intermediate image 811 is output. The intermediate image 811 is converted into a 7*7*1024 intermediate image 812 by the residual block 16. The average pooling operation is performed on the intermediate image 812 and a 1*1*1024 intermediate image 813 is output.

An accuracy of the analysis result is enhanced in response to a weight parameter being set based on a number, for example, 64, of convolution kernels in each convolution layer of the convolution block 11 and a number, for example, 128, 256, 512, and 1024, of channels of an intermediate image as a result of increasing a dimension by a residual block among the residual blocks 12 through 16.

Figure 8B:
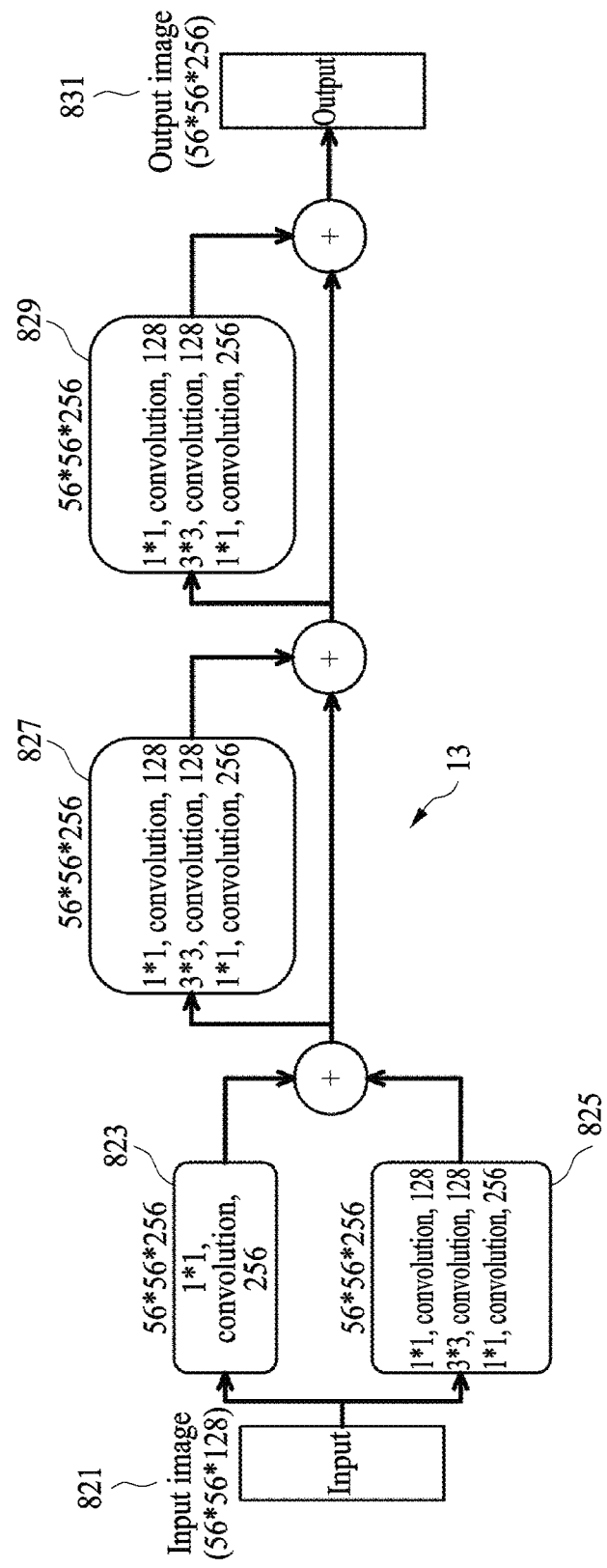
FIG. 8B illustrates an example of a residual block in a residual network.

FIG. 8B illustrates an example of the residual block 13 of FIG. 8A.

The residual blocks 12 through 16 of FIG. 8A have a residual structure. Structures of the residual blocks 12 through 16 are similar, but a number of convolution kernels of each of the residual blocks 12 through 16 may vary. A number of residual blocks may be 4 or 5.

For example, referring to FIG. 8B, a 56*56*128 (length*width*number of channels) input image 821 is input. A convolution operation is performed on the input image 821 by 128 1*1 convolution kernels. The convolution operation may be re-performed on a result of the convolution operation by 128 3*3 convolution kernels. The convolution operation may be re-performed on the result of the convolution operation by 256 1*1 convolution kernels, and a 56*56*256 intermediate image 825 is acquired.

The convolution operation is performed on the input image 821 by 256 1*1 convolution kernels, and a 56*56*256 intermediate image 823 is acquired. An adder combines the intermediate image 823 and the intermediate image 825.

The convolution operation is performed on a result of the combining by 128 1*1 convolution kernels. The convolution operation is re-performed on the result of the convolution operation by 128 3*3 convolution kernels. The convolution operation is re-performed on the result of the convolution operation by 256 1*1 convolution kernels, and a 56*56*256 intermediate image 827 is acquired.

The adder combines the result of combining the intermediate image 823 and the intermediate image 825, and the intermediate image 827.

The convolution operation is performed on the result of the combining by 128 1*1 convolution kernels. The convolution operation is re-performed on the result of the convolution operation by 128 3*3 convolution kernels. The convolution operation is re-performed on the result of the convolution operation by 256 1*1 convolution kernels, and a 56*56*256 intermediate image 829 is acquired.

The adder combines a result of the previous combining and the intermediate image 829, and a 56*56*256 output image 831 is output.

Figure 9A:
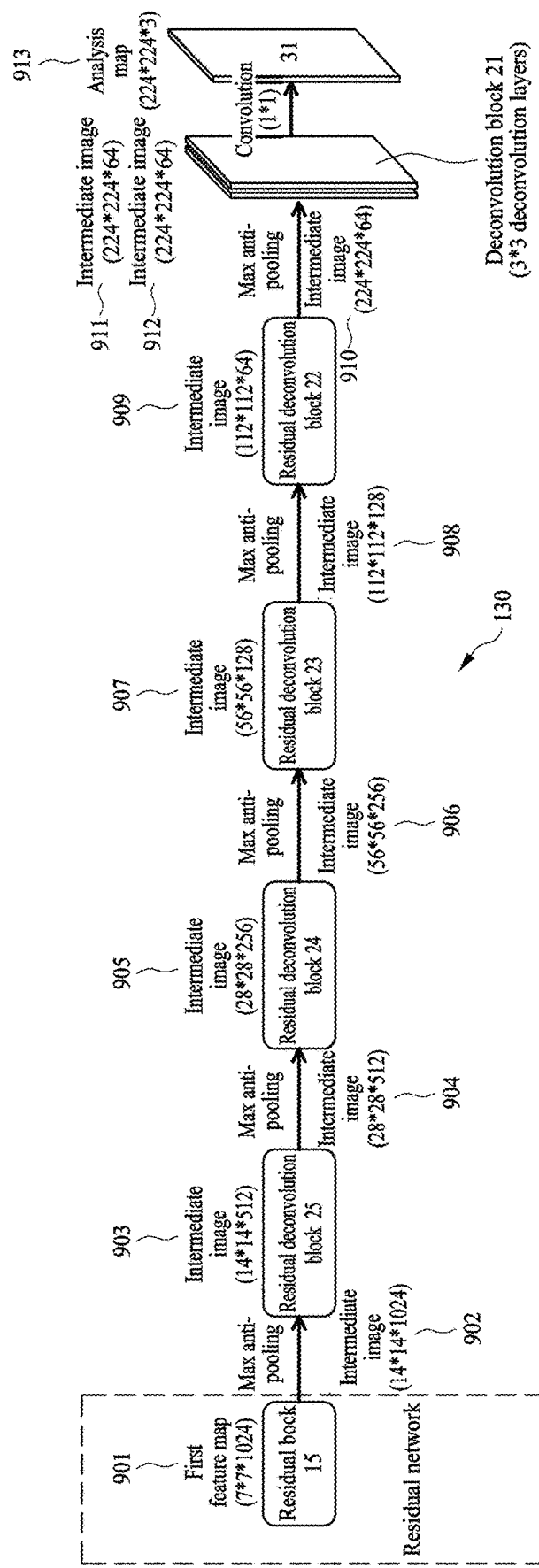
FIG. 9A illustrates an example of a residual deconvolution network.

FIG. 9A illustrates an example of the residual deconvolution network 130.

Referring to FIG. 9A, the trained residual deconvolution network 130 outputs an analysis map 913 from a feature map 901 corresponding to an output of an N-th residual block, for example, the residual block 15, of the residual network 120.

The residual deconvolution network 130 includes residual deconvolution blocks that are sequentially combined. The residual deconvolution network 130 further includes a deconvolution block positioned after a last residual deconvolution block. For example, the residual deconvolution network 130 includes residual deconvolution blocks 22 through 25, and the residual deconvolution blocks 22 through 25 correspond to respective residual blocks from the first residual block 12 to the N-th residual block 15 among the residual blocks 12 through 16 of the residual network 120.

For example, the residual deconvolution network 130 includes one deconvolution block 21, and the residual deconvolution blocks 22 through 25 that are combined in a direction from an input to an output. Similarly to the residual network 120, the residual deconvolution network 130 includes three or four residual deconvolution blocks, but a number of residual deconvolution blocks is not limited to this example.

A max anti-pooling operation is performed on an output of a first residual deconvolution block 25 among the residual deconvolution blocks 22 to 25, and a result of performing the max anti-pooling operation is input to a next level of a residual deconvolution block 24 of the first residual deconvolution block 25.

An output of the residual block 15 is input to the residual deconvolution network 130, and converted into a 14*14*1024 intermediate image 902 in response to the max anti-pooling operation being performed. The intermediate image 902 is converted into a 14*14*512 intermediate image 903 by the residual deconvolution block 25. The intermediate image 903 is converted into a 28*28*512 intermediate image 904 in response to the max anti-pooling operation being performed. The intermediate image 904 is converted into a 28*28*256 intermediate image 905 by the residual deconvolution block 24. The intermediate image 905 is converted into a 56*56*256 intermediate image 906 in response to the max anti-pooling operation being performed. The intermediate image 906 is converted into a 56*56*128 intermediate image 907 by the residual deconvolution block 23. The intermediate image 907 is converted into a 112*112*128 intermediate image 908 in response to the max anti-pooling operation being performed. The intermediate image 908 is converted into a 112*112*64 intermediate image 909 by the residual deconvolution block 22. The intermediate image 909 is converted into a 224*224*64 intermediate image 910 in response to the max anti-pooling operation being performed.

The analysis map 913 is acquired in response to a 1*1 convolution operation being performed on the intermediate image 910 by the deconvolution block 21. For example, the deconvolution block 21 includes two deconvolution layers, and each of the deconvolution layers includes 64 3*3 deconvolution kernels.

Figure 9B:
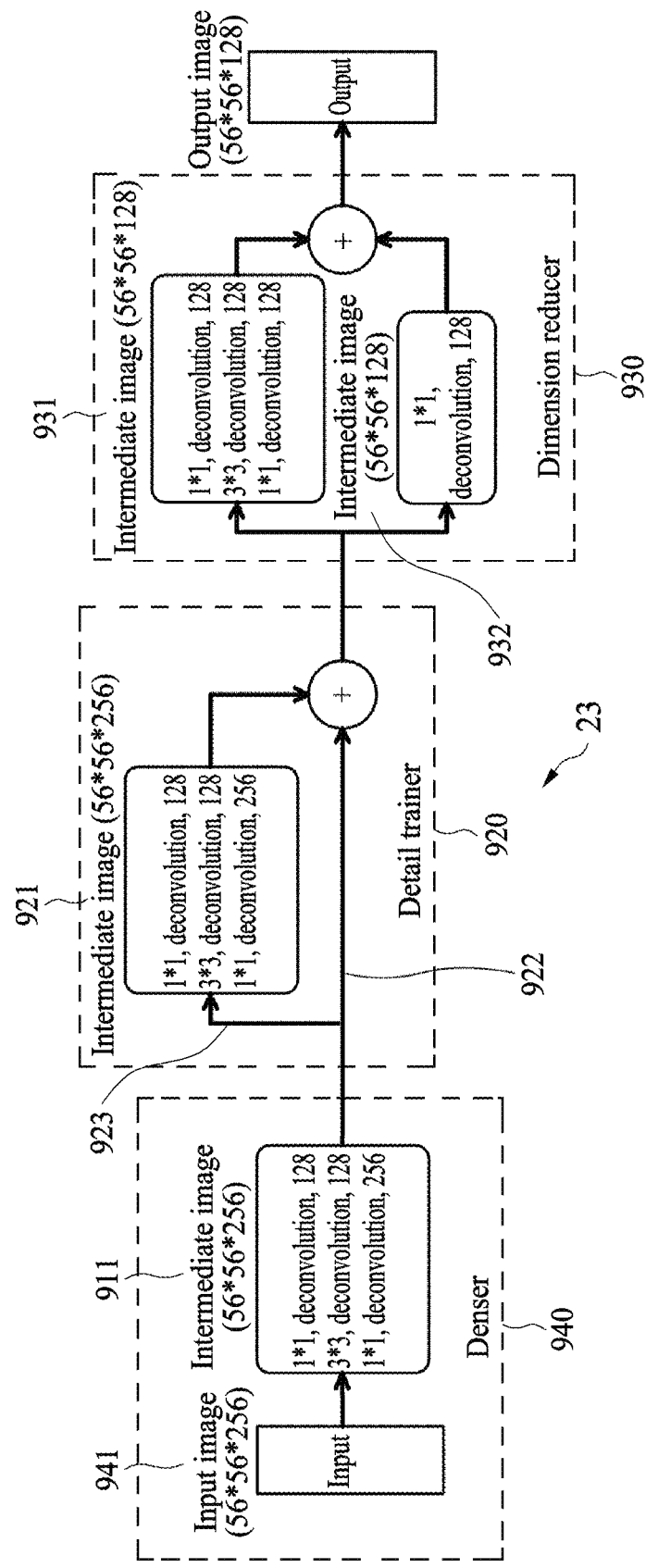
FIG. 9B illustrates an example of a residual deconvolution block in a residual deconvolution network.

FIG. 9B illustrates an example of the residual deconvolution block 23 of FIG. 9A.

Structures of the residual deconvolution blocks 22 through 25 are similar, but a number of deconvolution kernels of each of the residual deconvolution blocks 22 through 25 may vary.

Each of residual deconvolution blocks includes a denser 940, a detail trainer 920, and a dimension reducer 930. The denser 940 performs three deconvolution operations, the detail trainer 920 performs three deconvolution operations and summations, and the dimension reducer 930 performs four deconvolution operations and summations.

For example, a 56*56*256 (length*width*number of channels) input image 941 is input to the denser 940, and 128 1*1 deconvolution kernels in the denser 940 performs a deconvolution operation on the input image 941. The deconvolution operation may be re-performed on a result of the deconvolution operation by 128 3*3 deconvolution kernels, and the deconvolution operation may be re-performed on the result of the deconvolution operation by 256 1*1 deconvolution kernels.

The detail trainer 920 includes a residual branch 922 and a deconvolution branch 923. The deconvolution branch 923 includes three different deconvolution operations, and an operation result of the deconvolution branch 923 may be combined with an operation result of the denser 940 transferred to the residual branch 922.

For example, the operation result of the denser 940 is transferred to the detail trainer 920, and 128 1*1 deconvolution kernels in the detail trainer 920 perform the deconvolution operation on the operation result of the denser 940. The deconvolution operation may be re-performed on the result of the deconvolution operation by 128 3*3 deconvolution kernels, and the deconvolution operation may be re-performed on the result of the deconvolution operation by 256 1*1 deconvolution kernels. The result of the deconvolution operation is combined with the result of operation of the denser 940 transferred to the residual branch 922. The result of combining is transferred to the dimension reducer 930. The residual branch 922 easily optimizes the residual deconvolution network 130 by preventing a gradient from being distributed.

An output of the detail trainer 920 is transferred to the dimension reducer 930. The deconvolution operation is re-performed on the output of the detail trainer 920 by 128 1*1 deconvolution kernels. The deconvolution operation may be re-performed on a result of the deconvolution operation by 128 3*3 convolution kernels. The convolution operation is re-performed on the result of convolution operation by 128 1*1 convolution kernels, and a 56*56*128 intermediate image 931 is acquired.

A convolution operation is performed on the output of the detail trainer 920 by 128 1*1 convolution kernels, and a 56*56*128 intermediate image 932 is acquired. An adder combines the intermediate image 931 and the intermediate image 932 such that a 56*56*128 output image is acquired.

Figure 10:
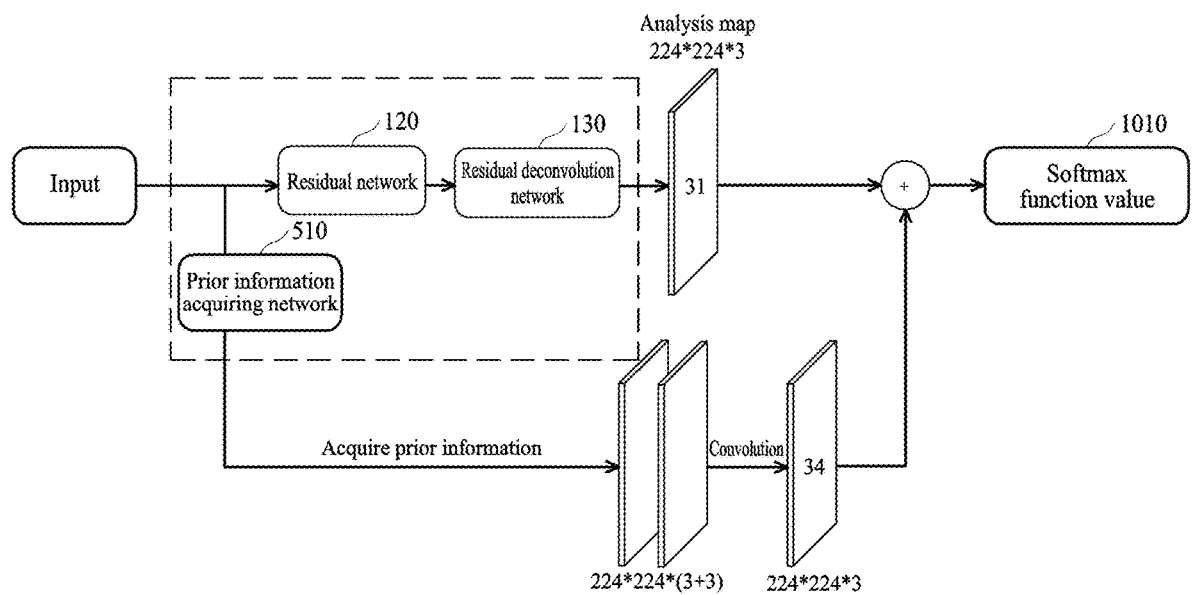
FIG. 10 illustrates an example of combining a result of a residual deconvolution network and a result of a prior information acquiring network.
Figure 11A:
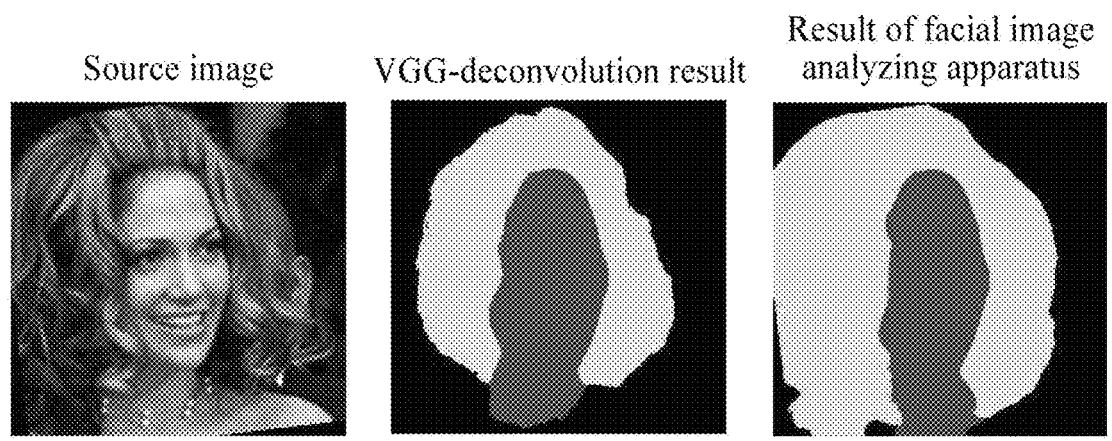
FIG. 11A illustrates an example of comparing a result acquired by a facial image analyzing apparatus and a result of VGG (visual geometry group)-deconvolution.
Figure 11B:
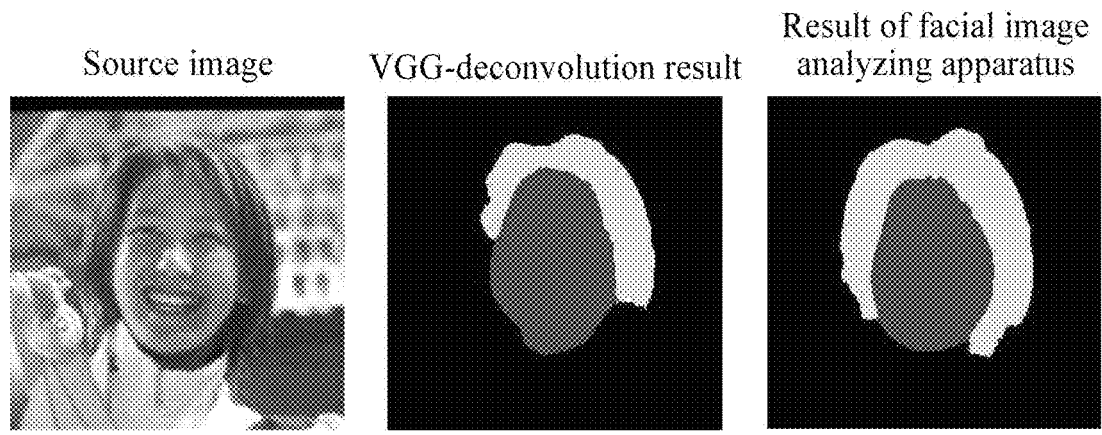
FIG. 11B illustrates another example of comparing a result acquired by a facial image analyzing apparatus and a result of VGG (visual geometry group)-deconvolution.
Figure 11C:
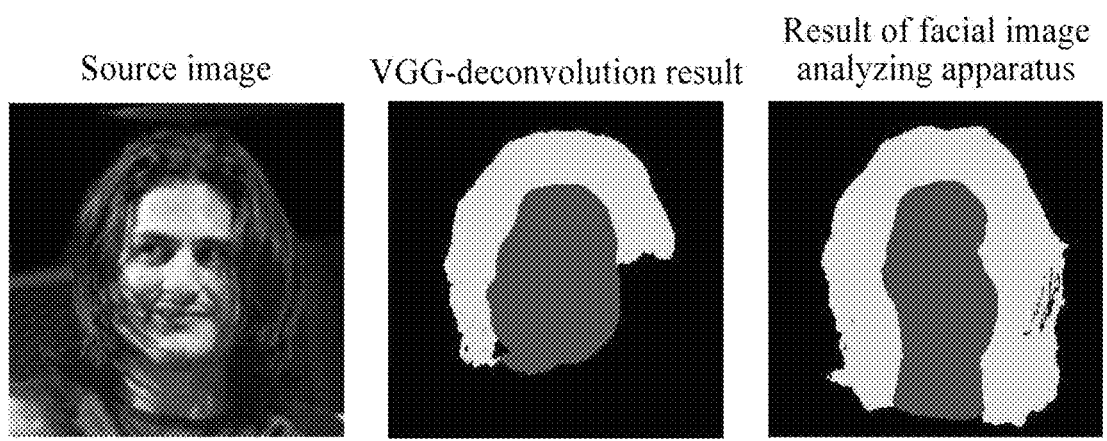
FIG. 11C illustrates another example of comparing a result acquired by a facial image analyzing apparatus and a result of VGG (visual geometry group)-deconvolution.
Figure 11D:
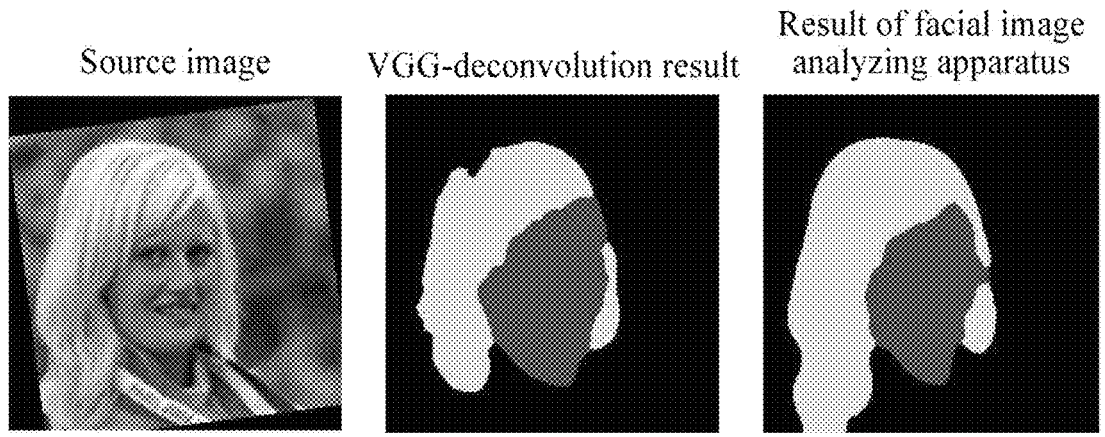
FIG. 11D illustrates another example of comparing a result acquired by a facial image analyzing apparatus and a result of VGG (visual geometry group)-deconvolution.

FIG. 10 illustrates an example of combining a result of the residual deconvolution network 130 and a result of the prior information acquiring network 510.

Referring to FIG. 10, a combination map is acquired by combining prior information and an analysis map output from the residual deconvolution network 130. A contribution plot of the prior information is acquired by performing a convolution operation on the combination map using a convolution kernel, and an analysis result is acquired by adding the contribution plot and the analysis map at an element level.

The prior information and an analysis map 31 output from the residual deconvolution network 130 are combined with each other. The convolution operation is performed on the prior information output from the prior information acquiring network 510 by a 224*224*(3+3) convolution kernel, and a contribution plot 34 is output as a result of the convolution operation. For example, in response to a channel corresponding to N and a size of an image corresponding to W*H, a size of the analysis map 31 and the prior information corresponds to W*H*N and a size of the combination map corresponds to W*H*2N. The contribution plot 34 is associated with each channel, and a size of the contribution plot 34 corresponds to W*H*N. The contribution plot 34 and the analysis map 32 output from the residual deconvolution network 130 are combined with each other at the element level, and a softmax function value 1010 is output by a softmax function and the analysis result is acquired.

FIGS. 11A through 11D illustrate examples of comparing a result acquired by a facial image analyzing apparatus and a result of VGG (visual geometry group)-deconvolution.

FIGS. 11A through 11D illustrate examples of results of using a labeled faces in the wild (LFW) database. The LFW database is internationally influential. Source images of FIGS. 11A through 11D indicate unprocessed facial images. The result of VGG-deconvolution is acquired based on the related VGG-deconvolution method, and the result of the facial image analyzing apparatus refers to a result acquired by the facial image analyzing apparatus 100. For example, referring to FIG. 11C, the result of the VGG-deconvolution method indicates that a portion of hair and a background are analyzed together, but the result of the facial image analyzing apparatus indicates that the hair and the background are clearly distinguished.

TABLE 1

|  | Result of facial image analyzing apparatus | Result of VGG-deconvolution method | Result of Liu's work method |
| --- | --- | --- | --- |
| Pixel accuracy | 97.53% | 97.06% | 95.12% |
| Model size | 103M | 960M | 127M |

Table 1 shows pixel accuracies and model sizes based on various methods. When compared to the related VGG-deconvolution method or the Liu's work method, a pixel accuracy of the facial image analyzing apparatus 100 is almost 97.53%, and a model size is only 103M. Thus, the facial image analyzing apparatus 100 reduces the model size while increasing the pixel accuracy.

The processor 110, the residual network 120, the residual deconvolution network 130, the prior information acquiring network 510, the convolution block 11, the residual blocks 12 to 16, the deconvolution block 21, the residual deconvolution blocks 22 to 25, the detail trainer 920, the dimension reducer 930, and the denser 940 in respective FIGS. 1, 5, 8A, 9A, 9B, and 10 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2-4, 67, 8A-8B, 9A-9B, and 10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method to analyze a facial image, comprising:
   inputting a facial image to a residual network comprising residual blocks that are sequentially combined and arranged in a direction from an input to an output;
   processing the facial image using the residual network; and
   acquiring an analysis map from an output of an N-th residual block among the residual blocks using a residual deconvolution network,
   wherein the residual network transfers the output of the N-th residual block to the residual deconvolution network, and N is a natural number that is less than a number of all of the residual blocks, and
   wherein the residual deconvolution network comprises residual deconvolution blocks that are sequentially combined, and the residual deconvolution blocks correspond to respective residual blocks from a first residual block among the residual blocks to the N-th residual block.

2. The method of claim 1, further comprising:
   acquiring prior information of the facial image using a prior information acquiring network; and
   acquiring an analysis result by combining the prior information and an output of the residual deconvolution network.

3. The method of claim 2, wherein the acquiring of the prior information of the facial image comprises:
   selecting facial image analysis training data comprising a face most similar to a face included in the facial image by comparing the face included in the facial image to each of faces included in the facial image analysis training data, and
   acquiring an average value of calibration information acquired from the face most similar the face included in the facial image as the prior information of the facial image.

4. The method of claim 2, wherein the acquiring of the analysis result comprises:
   acquiring a combination map by combining the prior information and the analysis map output from the residual deconvolution network,
   acquiring a contribution plot of the prior information by performing a convolution process on the combination map using a convolution kernel, and
   acquiring the analysis result by adding the contribution plot and the analysis map at an element level.

5. The method of claim 2, further comprising:
   enhancing the analysis result using a dense condition random field method.

6. The method of claim 5, wherein the enhancing of the analysis result comprises enhancing the analysis result by setting the analysis result as a unary term of a dense condition random field.

7. The method of claim 1, wherein
   the residual network further comprises a convolution block positioned before the first residual block, and
   the residual deconvolution network further comprises a deconvolution block positioned after a last residual deconvolution block among the residual deconvolution blocks.

8. The method of claim 1, wherein
   a max pooling operation is performed on an output of the first residual block,
   a result of the performing of the max pooling operation is input to a next level of a residual block of the first residual block,
   a max anti-pooling operation is performed on an output of a first residual deconvolution block among the residual deconvolution blocks, and
   a result of the performing of the max anti-pooling operation is input to a next level of a residual deconvolution block of the first residual deconvolution block.

9. The method of claim 1, wherein each of the residual deconvolution blocks comprises a denser, a detail trainer, and a dimension reducer.

10. The method of claim 9, wherein the detail trainer comprises a residual branch and a deconvolution branch.

11. The method of claim 1, wherein the residual network comprises four or five residual blocks, and a number of the residual deconvolution blocks is one less than a number of the residual blocks.

12. The method of claim 1, wherein each convolution layer among convolution layers of a convolution block included in the residual network comprises 64 convolution kernels, and each deconvolution layer among deconvolution layers of a deconvolution block included in the residual deconvolution network comprises 64 deconvolution kernels.

13. The method of claim 1, wherein the residual blocks increase a number of input data channels by two times, and the residual deconvolution blocks decrease the number of the input data channels by half.

14. The method of claim 1, wherein the N-th residual block comprises a next-to-last residual block or a second-from-last residual block among the residual blocks.

15. A facial image analyzing apparatus, comprising:
    a processor configured to input a facial image to a residual network configured to process the facial image and comprising residual blocks that are sequentially combined and arranged in a direction from an input to an output; and
    a residual deconvolution network configured to acquire an analysis map from an output of an N-th residual block among the residual blocks,
    wherein the residual network is configured to transfer the output of the N-th residual block to the residual deconvolution network, and N is a natural number that is less than a number of all residual blocks of the residual network, and
    wherein the residual deconvolution network comprises residual deconvolution blocks that are sequentially combined, and the residual deconvolution blocks correspond to respective residual blocks from a first residual block among the residual blocks to the N-th residual block.

16. The facial image analyzing apparatus of claim 15, further comprising:
    a prior information acquiring network configured to acquire prior information of the facial image, and to acquire an analysis result by combining the prior information and an output of the residual deconvolution network.

17. The facial image analyzing apparatus of claim 16, wherein the processor is further configured to enhance the analysis result based on a dense condition random field method.

18. A training method of a facial image analyzing apparatus comprising a residual network and a residual deconvolution network, the training method comprising:

training, in a pre-training operation, the residual network by adjusting a weight parameter of the residual network using face identification training data; and training, in a combined training operation, the residual network and the residual deconvolution network by adjusting a weight parameter of the residual deconvolution network and additionally adjusting the weight parameter of the residual network using facial image analysis training data, wherein the residual network comprises residual blocks that are sequentially combined and arranged in a direction from an input to an output, processes a facial image, and transfers an output of an N-th residual block among the residual blocks to the residual deconvolution network, wherein N is a natural number that is less than a number of all residual blocks of the residual network, and wherein the residual deconvolution network acquires an analysis map from the output of the N-th residual block comprises residual deconvolution blocks that are sequentially combined, and the residual deconvolution blocks correspond to respective residual blocks from a first residual block among the residual blocks to the N-th residual block.

19. The training method of claim 18, wherein the training in the pre-training operation comprises:

pre-training the residual network by inputting the face identification training data to the residual network, performing a face identifying operation, performing an average pooling operation on an output of a last residual block among the residual blocks, performing a full join operation on the residual network, and adjusting a weight parameter of the residual network.

20. The training method of claim 18, wherein the training in the combined training operation comprises:

adjusting the weight parameter of the residual network and the weight parameter of the residual deconvolution network by initializing the weight parameter of the residual network to be a weight parameter acquired from the pre-training operation, randomly initializing the weight parameter of the residual deconvolution network, inputting the output of the N-th residual block to the residual deconvolution network, inputting the facial image analysis training data to the residual network, and performing a facial image analyzing operation using the residual network and the residual deconvolution network.

* * * * *